United States Patent
Ende et al.

(10) Patent No.: US 11,524,405 B2
(45) Date of Patent: Dec. 13, 2022

(54) SCREWING DEVICE

(71) Applicant: Franka Emika GmbH, Munich (DE)

(72) Inventors: Tobias Ende, Munich (DE); Michael Haas, Todtenweis-Sand (DE); Saskia Golz, Munich (DE); Sven Parusel, Munich (DE); Simon Haddadin, Munich (DE)

(73) Assignee: Franka Emika GmbH, Munich (DE)

( * ) Notice: Subject to any disclaimer, the term of this patent is extended or adjusted under 35 U.S.C. 154(b) by 436 days.

(21) Appl. No.: 16/606,998

(22) PCT Filed: Apr. 18, 2018

(86) PCT No.: PCT/EP2018/059832
§ 371 (c)(1),
(2) Date: Oct. 21, 2019

(87) PCT Pub. No.: WO2018/197284
PCT Pub. Date: Nov. 1, 2018

(65) Prior Publication Data
US 2020/0391387 A1 Dec. 17, 2020

(30) Foreign Application Priority Data
Apr. 23, 2017 (DE) .......................... 102017003912.7

(51) Int. Cl.
*B25J 9/16* (2006.01)
(52) U.S. Cl.
CPC ............ *B25J 9/1679* (2013.01); *B25J 9/1633* (2013.01); *G05B 2219/40072* (2013.01);
(Continued)
(58) Field of Classification Search
CPC ........... G05B 2219/40087; G05B 2219/45091; G05B 2219/45203
(Continued)

(56) References Cited

U.S. PATENT DOCUMENTS 6,572,304 B1* 6/2003 Hessling ............ B64D 11/0696
403/321
7,920,124 B2* 4/2011 Tokita ..................... G06F 3/016
345/173
(Continued)

FOREIGN PATENT DOCUMENTS

DE 102006061752 A1 7/2008
DE 102010012598 A1 9/2011
(Continued)

OTHER PUBLICATIONS

English-language summary of Examination Report issued in JP 2019-557553 dated Nov. 2, 2021.
(Continued)

*Primary Examiner* — Jonathan L Sample
(74) *Attorney, Agent, or Firm* — Hoffmann & Baron, LLP

(57) ABSTRACT

A screwing device including: a container for screws; a manipulator having an effector to pick up a screw; an isolating unit connected to the container to provide the screw from the container at an interface such that a head of the screw is accessible to the effector; and a control unit to control the manipulator in executing a control program to perform operations including: guiding the effector along a trajectory having an orientation to the screw head at the interface, wherein the orientation is defined for locations along the trajectory; and executing force-regulated, impedance-regulated, and/or admittance-regulated periodic and closed tilting movements of the effector in relation to its orientation until a condition for a torque, a force, or a time for carrying out the tilting movements is reached or exceeded, and/or a force/torque and/or a position/speed signature at the effector is reached or exceeded, indicating successful pick-up of the screw.

20 Claims, 2 Drawing Sheets

(52) U.S. Cl.
CPC .............. *G05B 2219/40087* (2013.01); *G05B 2219/45091* (2013.01); *G05B 2219/45203* (2013.01)

(58) Field of Classification Search
USPC .................................................. 700/245–264
See application file for complete search history.

(56) References Cited

U.S. PATENT DOCUMENTS

| | | | |
|---|---|---|---|
| 9,360,148 B2* | 6/2016 | Herrick | ................ F16L 55/165 |
| 9,370,848 B2* | 6/2016 | Harada | ................... B23P 19/06 |
| 2004/0083010 A1 | 4/2004 | Nagata et al. | |
| 2008/0267737 A1 | 10/2008 | Hatanaka et al. | |
| 2011/0218676 A1 | 9/2011 | Okazaki | |
| 2011/0225787 A1 | 9/2011 | Sato et al. | |
| 2012/0317535 A1 | 12/2012 | Schmirgel et al. | |
| 2013/0067711 A1 | 3/2013 | Harada | |
| 2015/0127160 A1 | 5/2015 | Yamaguchi | |
| 2015/0314441 A1 | 11/2015 | Tsuchida et al. | |
| 2016/0075031 A1 | 3/2016 | Gotou | |
| 2018/0264648 A1* | 9/2018 | Kim | ..................... G05B 19/427 |
| 2020/0023520 A1* | 1/2020 | Yoshizumi | ............... B25J 9/161 |
| 2020/0391387 A1* | 12/2020 | Ende | ..................... B25J 9/1633 |

FOREIGN PATENT DOCUMENTS

| | | |
|---|---|---|
| DE | 102010032884 A1 | 2/2012 |
| DE | 102012108476 A1 | 3/2013 |
| DE | 102015005213 B4 | 8/2016 |
| JP | 61-208510 A | 9/1986 |
| JP | 9-136279 A | 5/1997 |
| JP | 2002-287816 A | 10/2002 |
| JP | 2011-194499 A | 10/2011 |
| JP | 2012161860 A1 | 8/2012 |
| JP | 2013-59816 A | 4/2013 |
| JP | 2013-059816 A | 4/2013 |
| JP | 2016-059983 A | 4/2016 |
| JP | 2016-59983 A | 4/2016 |
| WO | WO 2011/001569 A1 | 1/2011 |

OTHER PUBLICATIONS

English Translation of the International Preliminary Report on Patentability issued in International Application No. PCT/EP2018/059832 dated Nov. 7, 2019.

* cited by examiner

SCREWING DEVICE

CROSS-REFERENCE TO RELATED APPLICATIONS

The present application is the U.S. National Phase of PCT/EP2018/059832, filed on 18 Apr. 2018, which claims priority to German Patent Application No. 10 2017 003 912.7, filed on 23 Apr. 2017, the entire contents of which are incorporated herein by reference.

BACKGROUND

The invention relates to a screwing device, in which screws are automatically transferred from a storage container to a screwing tool of the screwing device.

SUMMARY

The object of the invention is to improve an automated screwing procedure, in particular an automated acceptance of screws by a screwing tool, and also to improve the reliability of a subsequent screwing procedure.

The invention results from the features of the independent claims. Advantageous refinements and embodiments are the subject matter of the dependent claims. Further features, possible applications, and advantages of the invention result from the following description, and also the explanation of example embodiments of the invention, which are illustrated in the figures.

A first aspect of the invention relates to a screwing device. The proposed screwing device includes a storage container for screws having a screw head, a screw head drive, and a threaded pin and also a robot manipulator having an effector, which is adapted to the screw head and the screw head drive and is embodied and configured to pick up, handle, and release such a screw. The term "adapted" in the present case means that the effector is embodied to pick up or grip the screw and to rotate the screw, i.e., to transfer torques into the screw.

Furthermore, the screwing device includes an isolating unit connected to the storage container, which provides the screws from the storage container at a (mechanical) interface isolated at a known position in such a way that a respective screw head is accessible to the effector. The screw head is advantageously freely accessible insofar as the effector can grasp or pick up the screw at the screw head. The effector advantageously includes a gripping device and/or a magnet device for picking up and/or grasping the screw head.

The device furthermore includes a control unit for controlling and/or regulating the robot manipulator, wherein the control unit is embodied and configured to execute the following first control program. The execution of the first control program activates the robot manipulator in such a way that the effector is guided by the robot manipulator along a predetermined trajectory T1 having a target orientation $O_{target,T1}(R_{T1})$ to the screw head of a screw provided at the interface, wherein along the trajectory T1 for locations $R_{T1}$ of the trajectory T1, the target orientation $O_{target,T1}(R_{T1})$ of the effector is defined, wherein to pick up the screw head in the effector, force-regulated and/or impedance-regulated and/or admittance-regulated rotational movements and/or tilting movements and/or translational movement patterns of the effector are executed by the robot manipulator until a predetermined limiting value condition G1 for a torque acting on the effector and/or a predetermined limiting value condition G2 of a force acting on the effector and/or a limiting value condition G3 for a time for carrying out the rotational and/or tilting movements and/or translational movement patterns is reached or exceeded and/or a provided force/torque signature and/or a position/speed signature at the effector is reached or exceeded, which indicates/indicate that the picking up of the screw by the effector has been successfully completed within predefined tolerances.

The term "trajectory" is understood in the present case as a path curve, in particular a three-dimensional path curve.

The term "signature" describes in the present case a predetermined parameter data set having associated values and/or interval limits and/or a predetermined time behavior (for example, by time derivatives) of a predetermined parameter data set for identification of the successful completion of the picking up of the screw by the effector. The "signature" thus describes a combination of parameters and/or the time behaviors thereof. Thus, for example, a predetermined force-time behavior can define the successful completion of picking up the screw.

The rotational and tilting movements of the effector advantageously only begin at a predetermined distance of the effector from the screw head to be picked up. This predetermined distance is advantageously 0.1 cm to 2 cm. This distance is advantageously dependent on the dimension of the screw head. The force-regulated rotational and tilting movements of the effector advantageously begin at greater distance if the screw head has a larger dimension and vice versa. The tilting movements advantageously take place in relation to the target orientation $O_{target,T1}(R_{T1})$ of the effector around one, two, or three tilting axes, wherein the corresponding tilt angles are advantageously in an angle range up to $\pm 1°$, $2°$, $\pm 5°$, $\pm 7°$, $\pm 10°$, $\pm 12°$, $\pm 15°$ in relation to the target orientation $O_{target,T1}(R_{T1})$. The rotational movements advantageously take place periodically around a rotational axis, and advantageously in a rotational angle range of $\pm 1°$, $\pm 2°$, $\pm 5°$, $\pm 7°$, $\pm 10°$, $\pm 12°$, $\pm 15°$. The tilting movements and/or the rotational movements are advantageously periodical movements. Depending on the application, the rotational movements and/or tilting movements and translational movements can also be aperiodic movements or a combination of aperiodic and periodic movements. The tilting movements and/or the translational movements are advantageously closed movements. A closed tilting movement is understood in the present case to mean that for an orientation O(t) of the effector, the following applies: $O(t_0)=O(t_1)$ where $t_0 < t_1$. A closed translational movement is understood in the present case to mean that the trajectory or at least a projection of the trajectory results in a closed curve. The tilting movements/rotational movements/translational movements are advantageously executed continuously.

In one preferred refinement of the proposed screwing device, the execution of the force-regulated and/or impedance-regulated and/or admittance-regulated rotational movements and/or tilting movements and/or translational movement patterns of the effector during the picking up of the screw head preferably takes place continuously, i.e., the corresponding movement of the effector is not interrupted in this case. The translational movement patterns are preferably closed movement patterns, in which a movement path of the effector or at least its projection results in a closed path. The tilting movements are also preferably closed movements, in which the effector is assigned from a first orientation $O(t_0)$ at the time $t_0$, wherein the following applies: $O(t_1)=O(t_0)$, where $t_1 > t_0$.

In one preferred refinement of the proposed screwing device, the execution of the force-regulated and/or impedance-regulated and/or admittance-regulated rotational movements and/or tilting movements and/or translational movement patterns of the effector during the picking up of the screw head preferably takes place cyclically, i.e., the corresponding movement of the effector takes place step-by-step (movement-stop-movement-stop-etc.). The movement phases and the stop phases are of equal chronological length in one advantageous refinement, in another advantageous refinement, they are of different chronological lengths.

The proposed screwing device enables improved advantageous picking up of screws from the interface.

The translational movement patterns executed in this invention are advantageously executed periodically using a continuous or step-by-step movement.

One advantageous refinement of the proposed screwing device is distinguished in that the control unit is embodied and configured to execute the following second control program. According to the second control program, the screw picked up by the effector is guided along a predetermined trajectory T2 having a target orientation $O_{target,T2}$ ($R_{T2}$) of the threaded pin of the screw to a thread arranged at a position known down to a tolerance band, wherein the target orientation $O_{target,T2}$($R_{T2}$) of the threaded pin of the screw is defined along the trajectory T2 for locations $R_{T2}$ of the trajectory T2, wherein force-regulated and/or impedance-regulated and/or admittance-regulated rotational movements and/or tilting movements and/or translational movement patterns of the screw are executed by the robot manipulator to introduce the free end of the threaded pin of the screw into the thread until a predetermined limiting value condition G4 for a torque acting on the effector and/or a predetermined limiting value condition G5 of a force acting on the effector is reached or exceeded and/or a provided force/torque signature and/or a position/speed signature on the effector is reached or exceeded, which indicates/indicate that the free end of the threaded pin is successfully introduced into the thread.

In one preferred refinement of the proposed screwing device, the execution of the tilting movements of the threaded pin in relation to its target orientation $O_{target,T2}$ ($R_{T2}$) advantageously takes place continuously, i.e., the corresponding movement of the effector is not interrupted in this case.

In one preferred refinement of the proposed screwing device, the execution of the rotational movements and/or translational movements takes place continuously, i.e., the corresponding movement of the effector is not interrupted in this case.

In one preferred refinement of the proposed screwing device, the execution of rotational movements and/or tilting movements and/or translational movement patterns of the threaded pin preferably takes place cyclically, i.e., the corresponding movement of the effector takes place step-by-step (movement-stop-movement-stop-etc.). The movement phases and the stop phases are of equal chronological length in one advantageous refinement, in another advantageous refinement, they are of different chronological lengths.

According to one advantageous refinement of the screwing device, the control unit is embodied and configured to execute the following third control program. According to this control program, after the successful introduction of the free end of the threaded pin into the thread, a force-regulated and/or impedance-regulated and/or admittance-regulated screwing of the screw into the thread takes place until a predetermined limiting value condition G6 for a torque acting on the effector and/or a predetermined limiting value condition G7 for a force acting on the effector is reached or exceeded and/or a provided force/torque signature and/or a position/speed signature on the effector is reached or exceeded, which indicates/indicate that the screw is successfully screwed into the thread.

In one advantageous refinement of the proposed screwing device, the control unit is embodied and configured in such a way that during the regulation of the above-mentioned movements of the effector and/or the robot manipulator, it is taken into consideration that an impedance, a pilot control force spiral, and/or a target position is time-variant.

One advantageous refinement of the screwing device is distinguished in that the screw(s) is/are ferromagnetic and the effector is magnetic, wherein the picking up and holding of the screw in the effector is effectuated because of the magnetic attraction of screw and effector.

One advantageous refinement of the screwing device is distinguished in that the picking up and holding of the screw in the effector is effectuated as a result of a partial vacuum. The screwing device includes a corresponding partial vacuum pump for this purpose, which is controlled and/or regulated accordingly by the control unit.

One advantageous refinement of the invention is distinguished in that the screwing device includes a data interface to a data network (for example, Internet, LAN (local area network), and the screwing device is configured and embodied for the purpose of loading the first and/or the second and/or the third control program and/or further control programs from the data network. The screwing device advantageously has a data interface and a corresponding program memory for this purpose. The control programs are advantageously made available by a central provider in the respective data network. The data network is advantageously a wired data network, a radio data network, or a combination thereof.

The screwing device is advantageously configured and embodied for the purpose of loading control and/or regulating parameters for the first and/or second and/or third control program and/or further control programs from the data network. The control and regulating parameters define the specific application of the corresponding control program. The control and regulating parameters are adapted in particular to the problem to be solved. The screwing device advantageously has a corresponding data memory for this purpose.

The screwing device is advantageously configured and embodied for the purpose of loading control and regulating parameters for the first and/or the second and/or the third control program and/or further control programs via a manual input interface of the screwing device (for example, a human-machine interface available in the region of the screwing device) and/or via a "teach-in procedure", during which the robot manipulator is manually guided, i.e., moved by application of a force by a user. Furthermore, both the manual input interface and also a "teach-in procedure" carried out using the robot manipulator enable a correction and/or adaptation of control and regulating parameters loaded from the data network.

The screwing device is advantageously configured and embodied so that the loading of control programs and/or of associated control and regulating parameters from the data network is controlled from a remote station, which is also connected to the data network. Such remote stations can be, for example, tablet PCs, smart phones, notebooks, personal computers, etc. A remote station is advantageously operated by a central provider.

The screwing device is advantageously configured and embodied for the purpose of transmitting control programs present locally on the screwing device and/or associated control and regulating parameters on request by a user in the data network and/or autonomously, for example, upon the presence of a predetermined condition, to other users in the data network. Such a "user" can in principle be any processing and/or memory unit configured for this data exchange.

The screwing device is advantageously configured and embodied for the purpose of starting control programs loaded locally on the screwing device with the associated control and regulating parameters from a remote station, which is also connected to the data network. Such remote stations can be, for example, tablet PCs, smart phones, notebooks, personal computers, etc. A remote station is advantageously operated by a central provider.

The remote station and/or the manual input interface on the screwing device advantageously includes a human-machine interface, which is embodied and configured for the input of control programs and/or associated control and regulating parameters, and/or for the selection of control programs and/or associated control and regulating parameters from a plurality of available control programs and/or associated control and regulating parameters.

The human-machine interface advantageously enables inputs via a "drag-and-drop" input on a touchscreen, a guided input dialogue, a keyboard, a computer mouse, a haptic input interface, virtual reality spectacles, an acoustic input interface, body tracking, based on electromyography data, based on electroencephalography data, via a neuronal interface to the brain of the operator, or combinations thereof.

The human-machine interface is advantageously embodied and configured for the output of an audiovisual, haptic, olfactory, tactile, or electrical feedback or a combination thereof.

A further aspect of the invention relates to a method for operating a screwing device, wherein the screwing device includes: a storage container for screws having a screw head, a screw head drive, and a threaded pin, a robot manipulator having an effector adapted to the screw head, which is embodied and configured to pick up and handle such a screw, an isolating unit connected to the storage container, which provides screws from the storage container isolated at an interface that has a known position in such a way that a respective screw head is accessible to the effector, and a control unit for controlling/regulating the robot manipulator, wherein the control unit executes the following first control program.

According to the first control program, the effector is guided by the robot manipulator along a predetermined trajectory T1 having a target orientation $O_{target,T1}(R_{T1})$ to the screw head of a screw provided at the interface, wherein along the trajectory T1 for locations $R_{T1}$ of the trajectory T1, the target orientation $O_{target,T1}(R_{T1})$ of the effector is defined, wherein to pick up the screw head in the effector, force-regulated and/or impedance-regulated and/or admittance-regulated rotational movements and/or tilting movements and/or translational movement patterns of the effector are executed by the robot manipulator until a predetermined limiting value condition G1 for a torque acting on the effector and/or a predetermined limiting value condition G2 of a force acting on the effector and/or a limiting value condition G3 for a time for carrying out the rotational and/or tilting movements and/or translational movement patterns is reached or exceeded and/or a provided force/torque signature and/or a position/speed signature at the effector is reached or exceeded, which indicates/indicate that the picking up of the screw by the effector has been successfully completed within predefined tolerances.

In one preferred refinement of the proposed method, the execution of the force-regulated and/or impedance-regulated and/or admittance-regulated rotational movements and/or tilting movements and/or translational movement patterns of the effector during the picking up of the screw head preferably takes place continuously, i.e., the corresponding movement of the effector is not interrupted in this case.

In one preferred refinement of the proposed method, the execution of the force-regulated and/or impedance-regulated and/or admittance-regulated rotational and/or tilting movements and/or translational movement patterns of the effector during the picking up of the screw head preferably takes place cyclically, i.e., the corresponding movement of the effector takes place step-by-step (movement-stop-movement-stop-etc.). The movement phases and the stop phases are of equal chronological length in one advantageous refinement, in another advantageous refinement, they are of different chronological lengths.

The term "signature" is used in the present case for a characteristic value combination and/or value sequence of the acquired forces and torques. The listed rotational and/or tilting movements are advantageously periodic and/or closed movements which take place continuously or step-by-step. Alternatively, the rotational and/or tilting movements can be aperiodic movements. Aperiodic movements and periodic movements can alternate. The translational movement patterns mentioned in this invention are advantageously executed periodically with a continuous or step-by-step movement.

One advantageous refinement of the method is distinguished in that the control unit executes the following second control program. According to the second control program, the screw picked up by the effector is guided along a predetermined trajectory T2 having a target orientation $O_{target,T2}(R_{T2})$ to a thread arranged at a known position, wherein the target orientation $O_{target,T2}(R_{T2})$ of the threaded pin of the screw is defined along the trajectory T2 for locations $R_{T2}$ of the trajectory T2, wherein force-regulated and/or impedance-regulated and/or admittance-regulated rotational movements and/or tilting movements and/or translational movement patterns of the screw are executed to introduce the free end of the threaded pin of the screw into the thread by the robot manipulator until a predetermined limiting value condition G4 for a torque acting on the effector and/or a predetermined limiting value condition G5 of a force acting on the effector is reached or exceeded and/or a provided force/torque signature and/or a position/speed signature on the effector is reached or exceeded, which indicates/indicate that the free end of the threaded pin is successfully introduced into the thread.

According to one refinement of the proposed method, the control unit executes the following third control program. According to the third control program, after the successful introduction of the free end of the threaded pin into the thread, a force-regulated and/or impedance-regulated and/or admittance-regulated screwing of the screw into the thread takes place until a predetermined limiting value condition G6 for a torque acting on the effector and/or a predetermined limiting value condition G7 for a force acting on the effector is reached or exceeded and/or a provided force/torque signature and/or a position/speed signature on the effector is reached or exceeded, which indicates/indicate that the screw is successfully screwed into the thread.

In the present case, the "successful" introduction of the free end of the threaded pin into the thread is understood to mean that the screw is introduced into the thread in such a way that the screw has "caught" in the thread, so that further screwing of the screw into the thread is possible.

One advantageous refinement of the method is distinguished in that the screwing device includes a data interface to a data network, and the screwing device loads the first and/or the second and/or the third control program and/or further control programs from the data network.

One advantageous refinement of the method is distinguished in that the screwing device loads control and regulating parameters for the first and/or second and/or third control program and/or for further control programs from the data network.

One advantageous refinement of the method is distinguished in that the screwing device loads control and/or regulating parameters for the first and/or the second and/or the third control program and/or for further control programs via a local input interface and/or via a "teach-in procedure", during which the robot manipulator is manually guided.

One advantageous refinement of the method is distinguished in that the loading of control programs and/or of associated control and regulating parameters from the data network into the screwing device is controlled from a remote station, which is also connected to the data network.

One advantageous refinement of the method is distinguished in that control programs provided locally in the screwing device and/or associated control and regulating parameters are transmitted upon request by a user in the data network or autonomously, for example, if a predetermined condition is present, to other users in the data network.

One advantageous refinement of the method is distinguished in that control programs provided/loaded locally on the screwing device are individually started with the associated control and regulating parameters from a remote station, which is also connected to the data network.

One advantageous refinement of the invention is distinguished in that the remote station and/or the local input interface includes/include a human-machine interface, in which inputs to control programs and/or associated control and regulating parameters and/or in which inputs for the selection of control programs and/or associated control and regulating parameters from a plurality of available control programs and/or associated control and regulating parameters take place.

One advantageous refinement of the method is distinguished in that the human-machine interface inputs take place via a "drag-and-drop" input on a touchscreen, a guided input dialogue, a keyboard, a computer mouse, a haptic input interface, virtual reality spectacles, an acoustic input interface, body tracking, based on electromyography data, based on electroencephalography data, via a neuronal interface to the brain of the operator, or a combination thereof.

A further aspect of the invention relates to a digital storage medium having electronically readable control signals, wherein the control signals can interact with a programmable computer system in such a way that a method as described above is executed.

A further aspect of the invention relates to a computer program product having program code stored on a machine-readable carrier for carrying out the method as described above when the program code is executed on a data processing device.

A further aspect of the invention relates to a computer program having program code for carrying out the method as described above when the program runs on a data processing device. For this purpose, the data processing device can be designed as any arbitrary computer system known from the prior art.

Further advantages, features, and details result from the following description, in which —possibly with reference to the drawings—at least one example embodiment is described in detail. Identical, similar, and/or functionally-identical parts are provided with identical reference signs.

DETAILED DESCRIPTION

Figure 1:
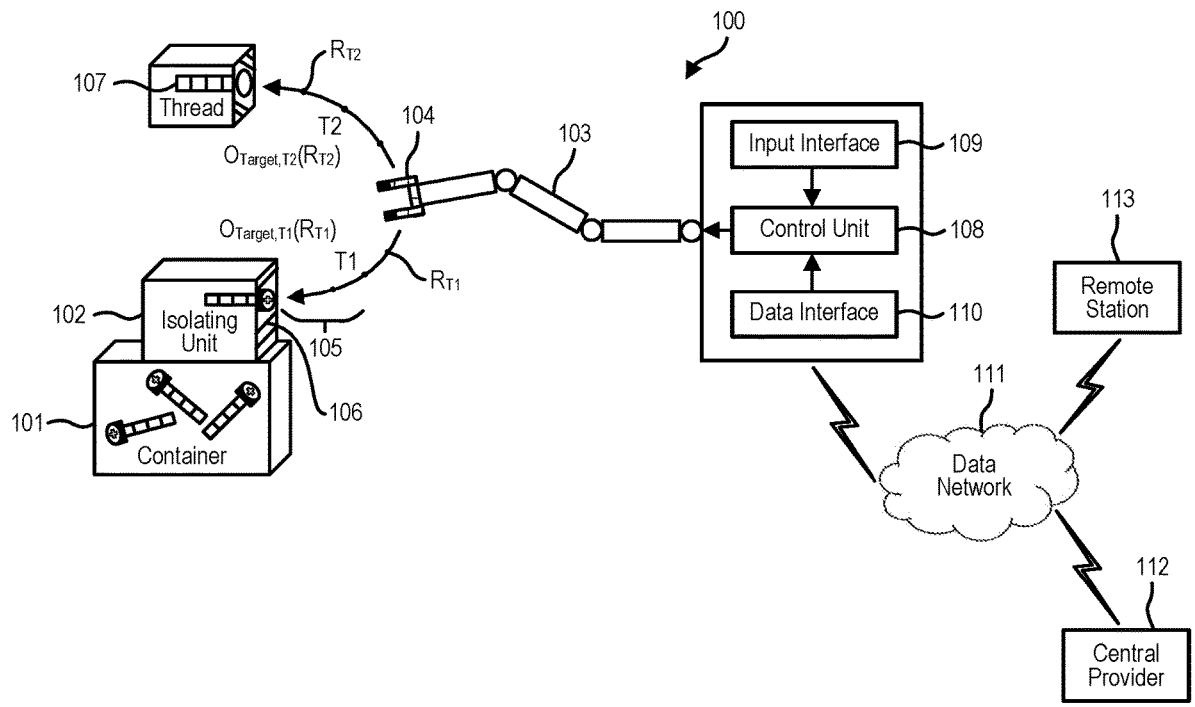
FIG. 1 shows a schematic illustration of a screwing device.

FIG. 1 shows a schematic illustration of the proposed screwing device 100. The screwing device 100 includes a storage container 101 for screws having a screw head, a screw head drive, and a threaded pin, a robot manipulator 103 having an effector 104 adapted to the screw head and embodied and configured to pick up and handle such a screw, an isolating unit 102 connected to the storage container 101, which provides screws from the storage container 102 isolated at an interface 106 at a known position in such a way that a respective screw head is accessible to the effector 104, and a control unit 108 to control/regulate the robot manipulator 103, wherein the control unit 104 is embodied and configured for executing the following first control program.

According to the first control program, the effector 104 is guided by the robot manipulator 103 along a predetermined trajectory T1 having a target orientation $O_{target,T1}(R_{T1})$ to the screw head of a screw provided at the interface 106 of the isolating unit 102, wherein along the trajectory T1 for locations $R_{T1}$ of the trajectory T1, the target orientation $O_{target,T1}(R_{T1})$ of the effector 104 is defined.

To pick up the screw head in the effector 104, force-regulated and/or impedance-regulated and/or admittance-regulated periodic and closed tilting movements of the effector 104 in relation to its target orientation $O_{target,T1}(R_{T1})$ are executed by the robot manipulator 103 until a predetermined limiting value condition G1 for a torque acting on the effector 104 and/or a predetermined limiting value condition G2 of a force acting on the effector 104 and/or a limiting value condition G3 for a time for carrying out the tilting movements is reached or exceeded and/or a provided force/torque signature and/or a position/speed signature on the effector 104 is reached or exceeded, which indicates/indicate that the picking up of the screw by the effector 104 is successfully completed within predefined tolerances. The tilting movements of the effector 104 advantageously first begin at a predetermined distance 105 of the effector 104 from the screw head to be picked up at the interface 106 of the isolating unit 102. The predetermined distance 105 can be 0.1 cm to 2 cm, and in particular can be 0.5 cm.

The control unit 108 is also embodied and configured to execute the following second control program. According to the second control program, the screw picked up by the effector 104 is guided along a predetermined trajectory T2 having a target orientation $O_{target,T2}(R_{T2})$ of the threaded pin of the screw to a thread 107 arranged at a position known, wherein the target orientation $O_{target,T2}(R_{T2})$ of the threaded pin of the screw is defined along the trajectory T2 for locations $R_{T2}$ of the trajectory T2, wherein force-regulated and/or impedance-regulated and/or admittance-regulated rotational movements and/or tilting movements and/or translational movement patterns of the screw are executed by the robot manipulator 103 to introduce the free end of the threaded pin of the screw into the thread 107 until a predetermined limiting value condition G4 for a torque acting on the effector 104 and/or a predetermined limiting value condition G5 of a force acting on the effector 104 is reached or exceeded and/or a provided force/torque signature and/or a position/speed signature on the effector 104 is reached or exceeded, which indicates/indicate that the free end of the threaded pin is successfully introduced into the thread 107.

The control unit 108 is further embodied and configured to execute the following third control program. According to the third control program, after the successful introduction of the free end of the threaded pin of the screw into the thread 107, a force-regulated and/or impedance-regulated and/or admittance-regulated screwing of the screw into the thread 107 takes place until a predetermined limiting value condition G6 for a torque acting on the effector 104 and/or a predetermined limiting value condition G7 for a force acting on the effector 104 is reached or exceeded and/or a provided force/torque signature and/or a position/speed signature on the effector 104 is reached or exceeded, which indicates/indicate that the screw is successfully screwed into the thread 107.

The screwing device 100 includes a data interface 110 to a data network 111 (e.g., Internet, LAN), and the screwing device 100 is configured and embodied for the purpose of loading the first control program, and/or the second control program, and/or the third control program, and/or further control programs from the data network 111 for execution by the control unit 108. The foregoing control programs can be made available by a central provider 112 in the data network 111.

The screwing device 100 is also configured and embodied for the purpose of loading control and regulating parameters for the first control program, and/or the second control program, and/or the third control program, and/or further control programs via a manual input interface 109 of the screwing device 100 (e.g., a human-machine interface) and/or via a "teach-in procedure", during which the robot manipulator 103 is manually guided. Furthermore, both the manual input interface 109 and the "teach-in procedure" that are carried out using the robot manipulator 103 enable a correction and/or adaptation of the control and regulating parameters loaded from the data network 111.

The screwing device 100 is configured and embodied so that the loading of the control programs and/or associated control and regulating parameters from the data network 111 is controlled from a remote station 113, which is also connected to the data network 111. The remote station 113 can be operated by the central provider 112. The remote station 112 and/or the manual input interface 109 on the screwing device 100 can include a human-machine interface, which is embodied and configured for the input of control programs and/or associated control and regulating parameters, and/or for the selection of control programs and/or associated control and regulating parameters from a plurality of available control programs and/or associated control and regulating parameters.

Figure 2:
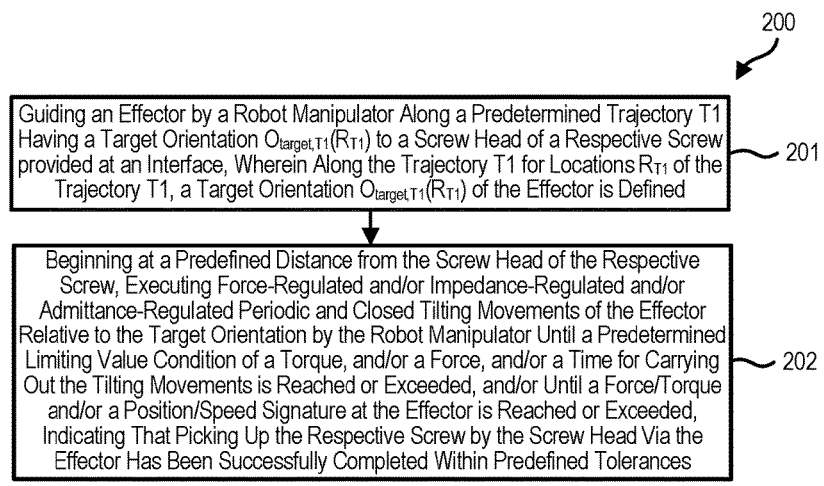
FIG. 2 shows a schematic flowchart of a proposed method for operating the screwing device to pick up a screw.

FIG. 2 shows a schematic flowchart of a proposed method 200 for operating a screwing device 100 to pick up a screw. The screwing device includes: a storage container 101 for screws having a screw head, a screw head drive, and a threaded pin, a robot manipulator 103 having an effector 104 adapted to the screw head, which is embodied and configured to pick up and handle such a screw, an isolating unit 102 connected to the storage container 101, which provides screws from the storage container isolated at an interface 106 at a known position in such a way that a respective screw head is accessible to the effector 104 of the robot manipulator 103, and a control unit 108 for controlling/regulating the robot manipulator 103.

The control unit 108 is configured and embodied to execute the first control program in order to perform the operations of the method 200. At operation 201, the effector is guided by the robot manipulator 103 along a predetermined trajectory T1 having a target orientation $O_{target,T1}(R_{T1})$ to the screw head of a screw provided at the interface 106 of the isolating unit 102, wherein along the trajectory T1 for locations $R_{T1}$ of the trajectory T1, the target orientation $O_{target,T1}(R_{T1})$ of the effector 104 is defined. At operation 202, beginning at a predefined distance 105 from the screw head of the screw, force-regulated and/or impedance-regulated and/or admittance-regulated periodic and closed tilting movements of the effector 104 in relation to its target orientation $O_{target,T1}(R_{T1})$ are executed by the robot manipulator 103 until a predetermined limiting value condition G1 for a torque acting on the effector 104 and/or a predetermined limiting value condition G2 of a force acting on the effector 104 and/or a limiting value condition G3 for a time for carrying out the tilting movements is reached or exceeded and/or a provided force/torque signature and/or a position/speed signature at the effector 104 is reached or exceeded, which indicates/indicate that the picking up of the screw by the effector 104 has been successfully completed within predefined tolerances.

Figure 3:
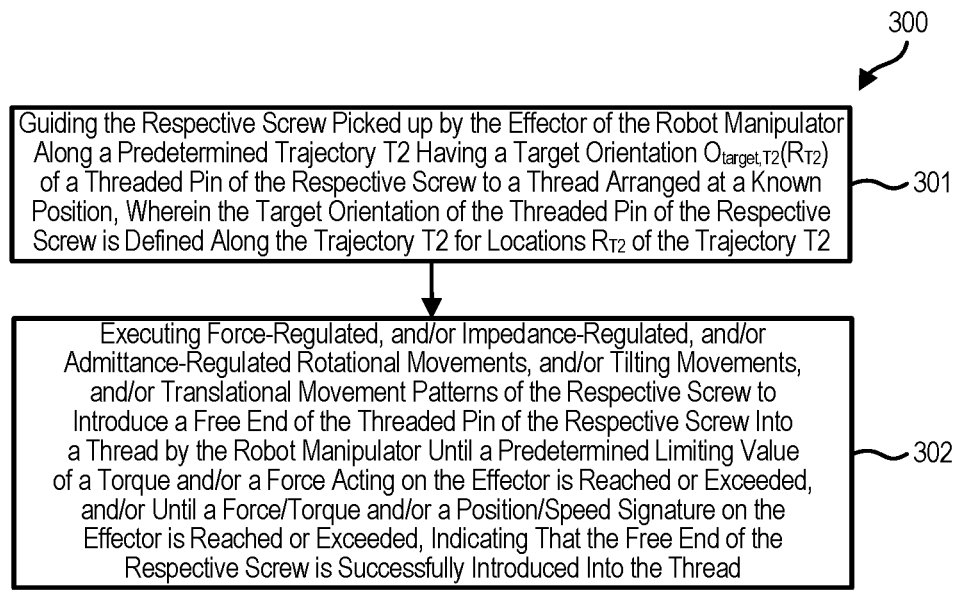
FIG. 3 shows a schematic flowchart of a proposed method for operating the screwing device to introduce a free end of a threaded pin of the screw into a thread.

FIG. 3 shows a schematic flowchart of a proposed method 300 for operating a screwing device 100 to introduce a free end of a threaded pin of the screw into a thread. The control unit 108 is configured and embodied to execute a second control program in order to perform the operations of the method 300.

At operation 301, the screw picked up by the effector 104 is guided along a predetermined trajectory T2 having a target orientation $O_{target,T2}(R_{T2})$ to the thread 107 arranged at a known position, wherein the target orientation $O_{target,T2}(R_{T2})$ of the threaded pin of the screw is defined along the trajectory T2 for locations $R_{T2}$ of the trajectory T2. At operation 302, force-regulated and/or impedance-regulated and/or admittance-regulated rotational movements and/or tilting movements and/or translational movement patterns of the screw are executed to introduce the free end of the threaded pin of the screw into the thread 107 by the robot manipulator 103 until a predetermined limiting value condition G4 for a torque acting on the effector 104 and/or a predetermined limiting value condition G5 of a force acting on the effector 104 is reached or exceeded and/or a provided force/torque signature and/or a position/speed signature on the effector 104 is reached or exceeded, which indicates/indicate that the free end of the threaded pin is successfully introduced into the thread 107.

Figure 4:
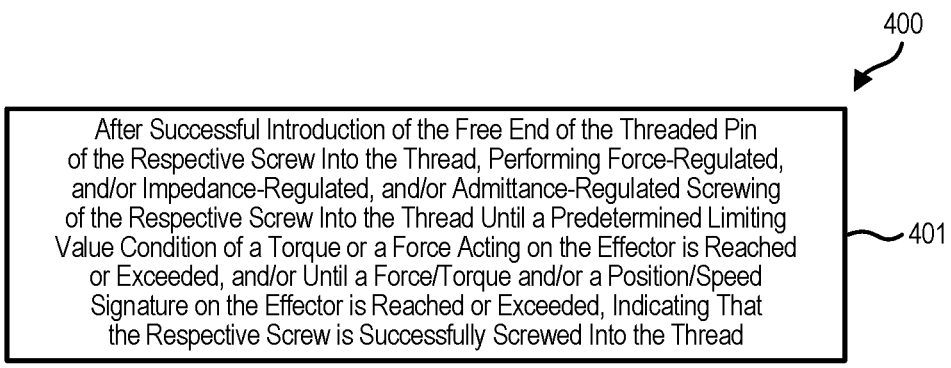
FIG. 4 shows a schematic flowchart of a proposed method for operating the screwing device to screw in the screw into the thread.

FIG. 4 shows a schematic flowchart of a proposed method 400 for operating a screwing device 100 to screw in the screw into the thread 107. The control unit 108 is configured and embodied to execute a third control program in order to perform the operations of the method 400.

At operation 401, after the successful introduction of the free end of the threaded pin of the screw into the thread 107, a force-regulated and/or impedance-regulated and/or admittance-regulated screwing of the screw into the thread 107 takes place until a predetermined limiting value condition G6 for a torque acting on the effector 104 and/or a predetermined limiting value condition G7 for a force acting on the effector 104 is reached or exceeded and/or a provided force/torque signature and/or a position/speed signature on the effector 104 is reached or exceeded, which indicates/indicate that the screw is successfully screwed into the thread 107.

In accordance with the methods, loading of the first control program, and/or the second control program, and/or the third control program, and/or further control programs can be performed by the screwing device 100 from the data network 111, e.g., from the central provider 112. Further in accordance with the methods, loading of control and regulating parameters for the first control program, and/or second control program, and/or third control program, and/or for further control programs can be performed by the screwing device 100 from the data network 111, e.g., the central provider 112.

Further in accordance with the methods, loading of control and/or regulating parameters for the first control program, and/or the second control program, and/or the third control program, and/or for further control programs, by the screwing device 100 can be performed by the screwing device 100 via the local input interface 109 and/or via a "teach-in procedure", during which the robot manipulator 103 is manually guided.

Yet further in accordance with the methods, loading of the control programs and/or associated control and regulating parameters from the data network 111 by the screwing device 100 can be controlled from a remote station 113, which is also connected to the data network 111.

Although the invention was illustrated and explained in greater detail by preferred example embodiments, the invention is not thus restricted by the disclosed examples and other variations can be derived therefrom by a person skilled in the art without leaving the scope of protection of the invention. It is therefore clear that a variety of possible variations exist. It is also clear that embodiments mentioned by way of example actually only represent examples which are not to be interpreted in any way as a delimitation of, for example, the scope of protection, the possible applications, or the configuration of the invention. Rather, the preceding description and the description of the figures make a person skilled in the art capable of concretely implementing the example embodiments, wherein a person skilled in the art aware of the disclosed concept of the invention can perform manifold modifications, for example, with respect to the function or the arrangement of individual elements mentioned in an example embodiment without leaving the scope of protection, which is defined by the claims and the legal correspondences thereof, such as more extensive explanation in the description.

LIST OF REFERENCE NUMERALS

101 storage container
102 isolating unit
103 robot manipulator
104 effector
105 predefined distance
106 interface
107 thread
108 control unit
109 input interface
110 data interface
111 data network
112 central provider
113 remote station
200, 300, 400 methods
201, 202 method steps of method 200
301, 302 method steps of method 300
401 method step of method 400

The invention claimed is:

1. A screwing device comprising:
   a storage container for screws having a screw head, a screw head drive, and a threaded pin;
   a robot manipulator having an effector, the effector adapted to the screw head and the screw head drive, and embodied and configured to pick up and handle the screws;
   an isolating unit connected to the storage container, the isolating unit comprising an interface at a known position, wherein the screw head of a respective screw isolated from the storage container is accessible to the effector at the interface; and
   a control unit to control or regulate the robot manipulator to pick up the screw head of the respective screw in the effector, wherein the control unit is embodied and configured to execute a first control program to perform operations comprising:
   guiding the effector by the robot manipulator along a predetermined trajectory T1 having a target orientation $O_{target,T1}(R_{T1})$ to the screw head of the respective screw provided at the interface, wherein along the trajectory T1 for locations $R_{T1}$ of the trajectory T1, the target orientation $O_{target,T1}(R_{T1})$ of the effector is defined;
   beginning at a predefined distance from the screw head of the respective screw, executing force-regulated and/or impedance-regulated and/or admittance-regulated periodic and closed tilting movements of the effector relative to the target orientation $O_{target,T1}(R_{T1})$ by the robot manipulator until a predetermined limiting value condition G1 of a torque acting on the effector and/or a predetermined limiting value condition G2 of a force acting on the effector and/or a limiting value condition G3 of a time for carrying out the tilting movements is reached or exceeded, and/or until a provided force/torque signature and/or a position/speed signature at the effector is reached or exceeded, indicating that picking up the respective screw by the screw head via the effector has been successfully completed within predefined tolerances.

2. The screwing device according to claim 1, wherein the control unit is embodied and configured to execute a second control program to perform operations comprising:
   guiding the respective screw picked up by the effector of the robot manipulator along a predetermined trajectory T2 having a target orientation $O_{target,T2}(R_{T2})$ of the threaded pin of the respective screw to a thread arranged at a position known down to a tolerance band, wherein the target orientation $O_{target,T2}(R_{T2})$ of the threaded pin of the respective screw is defined along the trajectory T2 for locations $R_{T2}$ of the trajectory T2; and executing force-regulated and/or impedance-regulated and/or admittance-regulated rotational movements and/or tilting movements and/or translational movement patterns of the respective screw to introduce a free end of the threaded pin of the respective screw into the thread by the robot manipulator until a predetermined limiting value condition G4 for a torque acting on the effector and/or a predetermined limiting value condition G5 of a force acting on the effector is reached or exceeded, and/or until a provided force/torque signature and/or a position/speed signature on the effector is reached or exceeded, indicating that the free end of the threaded pin of the respective screw is successfully introduced into the thread.

3. The screwing device according to claim 2, wherein the control unit is embodied and configured to execute a third control program to perform operations comprising:

after successful introduction of the free end of the threaded pin of the respective screw into the thread, performing force-regulated and/or impedance-regulated and/or admittance-regulated screwing of the respective screw into the thread until a predetermined limiting value condition G6 for a torque acting on the effector and/or a predetermined limiting value condition G7 for a force acting on the effector is reached or exceeded, and/or until a provided force/torque signature and/or a position/speed signature on the effector is reached or exceeded, indicating that the respective screw is successfully screwed into the thread.

4. The screwing device according to claim 3, wherein the screwing device comprises a data interface to a data network, and the screwing device is configured and embodied to load the first control program and/or the second control program and/or the third control program and/or further control programs from the data network.

5. The screwing device according to claim 4, wherein the screwing device is configured and embodied to load control and regulating parameters for the first control program and/or second control program and/or third control program and/or for further control programs from the data network.

6. The screwing device according to claim 4, wherein the screwing device is configured and embodied to load control and regulating parameters for the first control program and/or the second control program and/or the third control program and/or for further control programs via a manual input interface of the screwing device and/or via a teach-in procedure, during which the robot manipulator is manually guided.

7. The screwing device according to claim 4, wherein the screwing device is configured and embodied to control loading of the first control program and/or the second control program and/or the third control program and/or further control programs, and/or associated control and regulating parameters, from a remote station connected to the data network.

8. The screwing device according to claim 4, wherein the screwing device is configured and embodied to transmit control programs provided locally at the screwing device and/or associated control and regulating parameters upon request, or autonomously via the data network to other equivalent devices and/or other receivers.

9. The screwing device according to claim 6, wherein the screwing device is configured and embodied to start control programs loaded locally at the screwing device using associated control and regulating parameters from a remote station connected to the data network.

10. A method of operating a screwing device, wherein the screwing device comprises:

a storage container for screws having a screw head, a screw head drive, and a threaded pin, a robot manipulator having an effector, which is adapted to the screw head and the screw head drive, and is embodied and configured to pick up and handle the screws, an isolating unit connected to the storage container, the isolating unit comprising an interface at a known position, wherein the screw head of a respective screw isolated from the container is accessible to the effector at the interface, and a control unit to control or regulate the robot manipulator to pick up the screw head of the respective screw in the effector, wherein the control unit executes a first control program to perform operations of the method comprising:

guiding the effector by the robot manipulator along a predetermined trajectory T1 having a target orientation $O_{target,T1}(R_{T1})$ to the screw head of the respective screw provided at the interface, wherein along the trajectory T1 for locations $R_{T1}$ of the trajectory T1, the target orientation $O_{target,T1}(R_{T1})$ of the effector is defined; and beginning at a predefined distance from the screw head of the respective screw, executing force-regulated and/or impedance-regulated and/or admittance-regulated period and closed tilting movements of the effector relative to the target orientation $O_{target,T1}(R_{T1})$ by the robot manipulator until a predetermined limiting value condition G1 for a torque acting on the effector and/or a predetermined limiting value condition G2 of a force acting on the effector and/or a limiting value condition G3 of a time for carrying out the tilting movements is reached or exceeded, and/or a provided force/torque signature and/or a position/speed/acceleration signature at the effector is reached or exceeded, indicating that picking up the respective screw by the head via the effector has been successfully completed within predefined tolerances.

11. The method according to claim 10, wherein the control unit is embodied and configured to execute a second control program to perform operations of the method comprising:

guiding the screw picked up by the effector by the robot manipulator along a predetermined trajectory T2 having a target orientation $O_{target,T2}(R_{T2})$ of the threaded pin of the screw to a thread arranged at a position known down to a tolerance band, wherein the target orientation $O_{target,T2}(R_{T2})$ of the threaded pin of the screw is defined along the trajectory T2 for locations $R_{T2}$ of the trajectory T2; and executing force-regulated and/or impedance-regulated and/or admittance-regulated rotational movements and/or tilting movements and/or translational movement patterns of the screw are executed to introduce a free end of the threaded pin of the screw into the thread by the robot manipulator until a predetermined limiting value condition G4 for a torque acting on the effector and/or a predetermined limiting value condition G5 of a force acting on the effector is reached or exceeded, and/or until a provided force/torque signature and/or a position/speed signature on the effector is reached or exceeded, indicating that the free end of the threaded pin of the screw is successfully introduced into the thread.

12. The method according to claim 11, wherein the control unit is embodied and configured to execute a third control program to perform operations of the method comprising:

after successful introduction of the free end of the threaded pin of the screw into the thread, performing force-regulated and/or impedance-regulated and/or admittance-regulated screwing of the screw into the thread until a predetermined limiting value condition G6 for a torque acting on the effector and/or a predetermined limiting value condition G7 for a force acting on the detector is reached or exceeded, and/or until a provided force/torque signature and/or a position/speed signature on the effector is reached or exceeded, indicating that the screw is successfully screwed into the thread.

13. The method according to claim 12, wherein the screwing device comprises a data interface to a data network, further comprising loading by the screwing device the first control program and/or the second control program and/or the third control program and/or further control programs from the data network.

14. The method according to claim 13, further comprising loading by the screwing device control and regulating parameters for the first control program and/or second control program and/or third control program and/or for further control programs from the data network.

15. The method according to claim 13, further comprising loading by screwing device control and regulating parameters for the first control program and/or the second control program and/or the third control program and/or for further control programs via a manual input interface of the screwing device and/or via a teach-in procedure, during which the robot manipulator is manually guided.

16. The method according to claim 13, further comprising controlling loading by the screwing device of the first control program and/or the second control program and/or the third control program and/or further control programs, and/or associated control and regulating parameters, from a remote station connected to the data network.

17. The method according to claim 13, further comprising transmitting by the screwing device control programs provided locally at the screwing device and/or associated control and regulating parameters upon request, or autonomously via the data network to other equivalent devices and/or other receivers.

18. The method according to claim 15, further comprising starting by the screwing device control programs loaded locally at the screwing device using associated control and regulating parameters from a remote station connected to the data network.

19. The screw device according to claim 1, wherein the predefined distance of the effector from the screw head is 0.1 cm to 2 cm.

20. The method according to claim 10, wherein the predefined distance of the effector from the screw head is 0.1 cm to 2 cm.

* * * * *